United States Patent Office 3,282,899
Patented Nov. 1, 1966

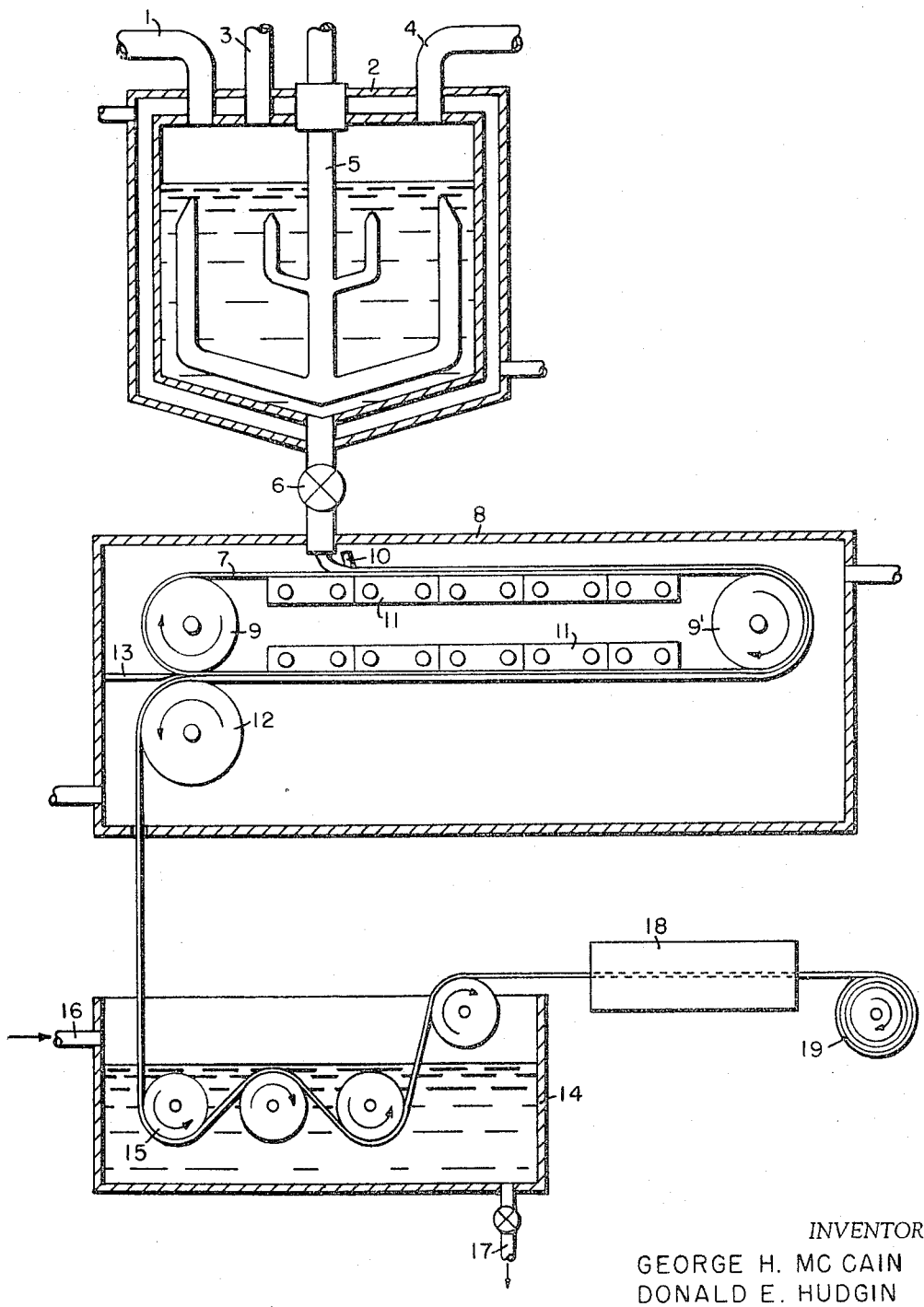

3,282,899
CHEMICAL PROCESS FOR COPOLYMERIZING CHLORAL AND DICHLOROACETALDEHYDE
George H. McCain, Donald E. Hudgin, and Irving Rosen, Painesville, Ohio, assignors to Diamond Alkali Company, Cleveland, Ohio, a corporation of Delaware
Filed Sept. 20, 1963, Ser. No. 310,345
25 Claims. (Cl. 260—67)

This invention relates to a process for preparing useful plastic articles such as film, sheeting and moldings having fire-retardant properties. More particularly, it relates to a process, which can be continuous, whereby a monomer mixture, for example, chloral and dichloroacetaldehyde may be copolymerized directly into tough and durable finished plastic articles as described.

It has been found that monomeric mixtures of chloral and dichloroacetaldehyde may be converted in substantial yield to high molecular weight copolymers by contacting such mixtures with anionic-type polymerization catalysts, especially organometallic compounds, such as dialkyl zincs, dialkyl cadmiums, alkyl lithiums, alkyl magnesiums and the like, the process for so preparing these high molecular weight copolymers being described in a pending application, Serial No. 300,094, filed August 5, 1963, in the names of Irving Rosen and George H. McCain. The copolymer products obtained by this process are in the form of agglomerated particles which subsequently must be washed, dried and ground or otherwise pulverized before these products can be processed into useful plastic articles.

It is an object of this invention, therefore, to provide a process whereby polymeric film, sheeting or various molded products may be prepared simultaneously with the copolymerization of a mixture of chloral and dichloroacetaldehyde monomers, thereby making it unnecessary to process the formed copolymers further.

It is another object of this invention to provide, by an improved process which may be continuous, useful plastic articles such as described above from high molecular weight chloral-dichloroacetaldehyde copolymers.

These and other objects of this invention will become apparent to those skilled in the art by the description of the invention which follows.

In general, the present invention encompasses the polymerization of a mixture of chloral and dichloroacetaldehyde monomers directly into tough and durable formed copolymer articles which process comprises thoroughly mixing together a mixture of the said monomers with a polymerization catalyst therefor, thereafter charging the reaction mixture prepared to a forming means, effecting the substantial polymerization of the said monomer mixture while it is thus supported by the forming means, and finally removing the formed copolymer product from the said forming means, washing and drying said product.

The term "forming means" as used herein in the specification and claims is intended to refer to solid molding or shaping devices, such as conventionally used sectional-type molds containing either one or a plurality of mold cavities in which the formed copolymer products of the present invention can be prepared by charging such molds with the reaction mixture as defined above and effecting its polymerization therein. The term "forming means" is likewise intended to refer to solid shaping devices, such as movable belts, and rotatable drums, wheels and the like upon which the reaction mixture, as defined above, can be cast and then polymerized while supported by such a substrate.

More specifically, the present invention comprises thoroughly mixing together, either in the presence or substantially in the absence of an inert organic liquid reaction medium, a monomer mixture containing from about 30 up to 99 mol percent of chloral and from about 1 up to 70 mol percent of dichloroacetaldehyde with a sufficient amount of an anionic polymerization catalyst to effect the desired copolymerization; withdrawing the resulting flowable reaction mixture from the mixing chamber and either (a) Casting it as a layer or film onto a solid substrate contained in a second chamber, effecting the copolymerization of the cast reaction mixture while it is thus supported in the second chamber and then withdrawing and collecting the finished copolymer film or sheeting product; or (b) Depositing the said flowable reaction mixture into suitable molds wherein the copolymerization reaction is effected and from which the desired copolymer moldings then are subsequently removed.

In one particular embodiment of the invention, designated hereinabove as procedure (a), and illustrated by the accompanying drawing, the mixture-containing liquid chloral and dichloroacetaldehyde monomer is introduced through jacketed line 1 into the jacketed mixing chamber 2 which is maintained at a temperature of −78° C. by passing refrigerant through the mixer jacket. Anhydrous toluene solvent is introduced through line 3. The n-heptane solution containing 25 percent, by weight, of diethyl zinc catalyst is introduced through jacketed line 4, said catalyst being added to the mixing chamber in an amount which is equivalent to about 0.3 to 5 millimols per mol of the combined monomer charge. An inert atmosphere is maintained in the comonomer, the solvent and the catalyst storage containers, the reaction addition lines and in the mixing chamber.

The reactants contained in mixing chamber 2 are vigorously mixed by an agitator 5 of variable speed. In order to insure its thorough mixing, the agitator is operated at about 5000 r.p.m. at the start of the reaction; it is rotated at a higher speed as the copolymerization progresses in the mixing chamber, and the mixture becomes less fluid.

The reaction mixture, containing the desired amount of polymer is then withdrawn through valve 6 and dropped onto a moving belt 7 which is enclosed in a chamber 8, likewise maintained under an inert atmosphere. The belt 7 is mounted under tension on two cylinders 9 and 9', situated on the same level but at some distance apart and rotated in the same direction.

As the reaction mixture is applied to the belt, it is spread or cast by a doctor blade 10 of adjustable height, said doctor blade being positioned adjacent to the valve through which the mixture is introduced. The belt with the applied layer of polymeric mixture thereon is advanced over a series of heat exchangers 11 through which refrigerant is circulated to maintain the temperature of said polymeric mixture at about −60° C. Refrigerant is likewise circulated through cylinder 9' so that the polymerization temperature is maintained consistently throughout. The copolymerization of the monomer which has been partially effected in the mixing chamber 2, is completed as the polymeric mixture is moved through the casting chamber 8. The thickness of the copolymerized film layer is further gauged by passing it between cylinders 9 and 12, said cylinder 12 being vertically adjustable so that various clearances between it and cylinder 9 are possible.

The loosely adhering copolymer film is then removed from the belt by a blade 13 and is advanced into a treating chamber 14 wherein it is washed to remove any unreacted monomer, solvent and remaining catalyst residues. Within the treating tank, the film is passed over a series of rollers 15 rotated alternatingly in opposite directions.

The treating tank is fitted with an adduct valve 16 whereby fresh treating solution may be admitted; and a withdrawal valve 17 from which solution containing monomer, solvent and/or catalyst residues may be withdrawn and cycled to apparatus for reclaiming these materials. After the copolymer film has been subjected to the washing treatment, it is drawn through an oven 18 maintained at a temperature of about 100° C. and dried. The finished dried film is then wound on a film winding mechanism 19.

In a continuously-operated process there may be employed one or more successively spaced connected mixing chambers in addition to mixing chamber 2 through which the polymeric mixture prepared in chamber 2 is cycled before being deposited on the solid substrate and cast into films. As the mixture is advanced and mixed in each chamber, the percentage of converted comonomers therein is progressively increased. Concurrently, additional quantities of polymeric mixture are being prepared in chamber 2 by the addition thereto of fresh comonomer mixture, polymerization catalyst and liquid reaction medium.

In another particular method of carrying out this invention, referred to hereinabove and hereinafter as procedure (b), the reaction mixture is prepared as described and illustrated in procedure (a). Accordingly, the liquid monomer mixture is introduced through the jacketed line into the jacketed mixing chamber maintained at a similar temperature. Likewise, the anhydrous toluene and catalyst solution are similarly introduced with from about 0.3 to 5 millimols of catalyst being used per each mol of combined monomer charge. Also, in this procedure, as in procedure (a) above, an inert atmosphere is maintained in the comonomer, the solvent and the catalyst storage containers, the reaction addition lines and in the mixing chamber.

In this embodiment, however, the reactants are vigorously mixed together in the mixing chamber for a maximum time period of only about five minutes, which time is usually sufficient to effect thorough mixing of the ingredients and to assure complete homogeneity of the mixture. The homogeneous, solution-like, fluid reaction mixture is then charged to the particular mold employed which is constructed of an inert corrosion resistant material, e.g., stainless steel, the said mixture being withdrawn from the mixing chamber through a valved line at the bottom of the chamber which is attached to the top of the mold. The mold, which is chilled to a temperature of −78° C. by means of a cooling bath, is provided with venting means whereby an even atmosphere is maintained therein by a slight positive inert gas pressure. When the copolymerization reaction is completed, the mold is opened and the finished copolymer moldings removed therefrom. After being then thoroughly leached with a solvent such as methanol, diethyl ether or the like to remove any unreacted monomers, solvent and/or remaining catalyst residues therefrom, the molded materials are dried at about 35° to 50° C. under vacuum.

It is also possible to prepare by this procedure a plurality of molded articles at one time if, after charging the desired quantity of the reaction mixture into the mold, as described above, a series of additional molds are then charged successively with the reaction mixture, said molds each being maintained at the reaction temperature and means also being provided in each mold to maintain an inert atmosphere therein. After being charged, each mold is, of course, sealed by suitable means. Alternatively, to prepare a large number of moldings, simultaneously by this procedure, one or more multiple-cavity molds may also be employed.

While the present invention has been described hereinabove in particular embodiments thereof, it is to be understood that other modifications may be employed herein with respect to either one or to both procedures, which modifications are within the scope of this invention.

With regard to the monomers, for example, the means by which the chloral and dichloroacetaldehyde are introduced into the mixing chamber is optional. As illustrated in the particular embodiments above, for example, these materials are introduced as a monomer mixture, having first been thoroughly premixed and chilled to the reaction temperature prior to being charged to the mixing chamber. Alternatively, however, these comonomers may be reacted with equal efficiency when they are introduced into the mixing chamber simultaneously but via separate adduct lines. The means by which the solvent, if employed, is introduced into the mixing chamber is optional. Instead of being introduced into the chamber as illustrated in the embodiments, the solvent may be premixed with either one or both of the comonomers or with the comonomer mixture prior to being charged to the mixing chamber.

In general, the particular catalyst employed in the process of this invention may be used in an amount ranging from about 0.03 to about 0.5 molar percent, i.e., from about 0.3 to 5 millimols for each mol of combined monomer charge. However, an amount of catalyst within the range of about 0.5 to 2.0 millimols per mol of combined monomer charge usually has been found satisfactory and is preferred.

Compounds suitable for initiating or catalyzing the copolymerization reaction are anionic-type polymerization catalysts in general, and organometallic compounds in particular. Such organometallic compounds include dialkyl zincs, e.g., diethyl zinc, dibutyl zinc and the like; dialkyl cadmiums, such as diethyl cadmium; organolithiums as, for example, butyl lithium, 9-fluorenyl lithium and the like; combinations of organolithiums and dialkyl zincs, such as 2,6-dimethoxyphenyl lithium and diethyl zinc; combinations of at least two different dialkyl zincs, e.g., diethyl and dibutyl zinc, and the like. Also suitable are any one of these catalysts, either alone or in combination, which is further modified or complexed with no more than a molar equivalent amount of water or of a lower aliphatic alcohol, e.g., ethanol. To obtain finished articles having the most desirable properties, the dialkyl zinc catalysts are particularly preferred for use.

As previously stated, the copolymerization generally may be carried out in the presence or in the absence of an inert, organic liquid reaction medium which is a solvent for the monomer and is a liquid at the reaction temperature. Accordingly, the "in place" molding operation, procedure (b), may be effected with equal efficiency with or without solvent, i.e., by either solution or "bulk" copolymerization. However, when preparing finished articles such as film or sheeting materials by procedure (a) it is preferred to use a solvent since a solvent provides an efficient means for controlling the viscosity and flow characteristics of the reaction mixture. Hydrocarbons in general are suitably employed with the aromatic hydrocarbons, e.g., toluene being especially preferred. Introduced into the mixing chamber through a pipeline provided, the solvent is generally employed in up to equal volumes with respect to the combined monomer charge.

In general, the process of this invention may be effected in a time period of 2 to 20 hours. When preparing film and sheeting products, the total process, i.e., from the addition and mixing of the copolymerization ingredients to the recovery of the finished film or sheeting materials, will be accomplished typically in about six hours. During the process the reaction mixture is retained in the mixing chamber for a time period sufficient to partially polymerize the monomer mixture prior to casting the said flowable mixture onto the support. This time period will naturally vary depending upon the catalyst system employed and also upon factors, such as the amount of solvent in the reaction mixture, the reaction temperature, etc.

It should be noted that it is important to regulate the degree to which the monomers are copolymerized in the mixing chamber since the percentage of converted monomers present therein will affect the viscosity of the resulting polymeric mixture. By controlling the extent of the monomer conversion in the mixing chamber, therefore, it is possible to control the flow of the polymeric mixture as it is dropped on to the belt. After casting, the copolymerization of the copolymeric mixture is then substantially concluded while it is carried on the moving belt through the casting chamber.

The thickness of the polymeric film and sheeting products obtained may be varied over wide limits, i.e., a thickness ranging from about 10 mils to about 75 mils. It will be easily recognized that thicknesses of these products may be adequately controlled by several variable factors involved in the process such as the percentage of converted monomer in the polymeric mixture, the viscosity and flow properties of said mixture and the rate at which it is deposited on the belt as well as the height above the belt to which the doctor blade has been adjusted.

When preparing molded articles, procedure (b), the entire process, i.e., from the addition and mixing of the reaction ingredients to the recovery of the finished moldings, generally may be effected in a time period of from 2 to about 20 hours, with reaction times of 6 to 10 hours being typical. In contrast to procedure (a), the reaction mixture in this procedure is contained in the mixing chamber only long enough to thoroughly blend the reaction ingredients together, which mixing time usually is no more than about 5 minutes. The blended reaction mixture is then charged to the mold and the copolymerization is effected entirely therein.

As described previously, either one or a plurality of single- or multiple-cavity molds may be effectively employed in the process to prepare the molded products of this invention. Such molds are sectional molds so that the finished articles prepared may easily be removed therefrom. They are fitted with gaskets of an inert material such as Teflon, polyethylene and the like, and are tightly closed together before use, thus preventing contaminants such as oxygen or moisture from entering into the reaction, since such contaminants will substantially inhibit the desired monomer conversion. In the particular embodiment of this process described above, the molds employed are maintained at the reaction temperature by immersion in a cold bath. Alternatively, however, jacketed molds may be employed, if more convenient, and the desired temperature is attained by circulating a suitable refrigerant through the jacket.

It is essential that the copolymerization process be conducted under anhydrous or substantially anhydrous conditions. For the most satisfactory copolymer products it has been established that the reaction ingredients, i.e., the monomers, or the monomers and solvent in combination, should contain less than about 50 p.p.m. of water. The monomers are advantageously dried prior to polymerization by fractional distillation with subsequent passage of the formed monomer vapors through an absorbent such as molecular sieves. The solvent may be dehydrated prior to use by standard distillation and drying methods.

As described previously, the process of this invention generally may be conducted at temperatures ranging from −78° to 0° C., with reaction temperatures of −78° to −30° C. being preferred.

Other modifications may be made in the process which are within the scope of the invention. For example, when preparing film or sheeting products, procedure (a), instead of allowing the polymeric mixture to flow from the mixing chamber by gravity, a pump may be employed to withdraw this material and deposit it on the belt.

In this procedure, the process may be modified further by contacting the comonomer mixture with the polymerization catalyst initially in the casting chamber and thereafter effecting the entire polymerization reaction while the resultant comonomer-catalyst mixture is contained in this chamber. In such a modification of the process, the polymerization catalyst solution is applied onto the solid substrate directly through an adduct line provided, instead of being first contacted and partially reacted with the monomer mixture in the mixing chamber. As the polymerization catalyst is thus being applied to the substrate, the liquid monomer or monomer mixture is applied thereto and intimately contacted with the catalyst. The comonomer ingredients may be applied with or without additional organic liquid or solvent. If a solvent is employed, this material is admixed with the monomer mixture in the mixing chamber prior to being cast on the substrate. Furthermore, during a major portion of the reaction time period, i.e., for about 5 hours, the ingredients are contained in the casting chamber and the copolymerization is concluded within this time.

Film and sheeting materials may also be prepared by casting the polymeric mixture onto a rotating drum or onto a horizontal rotating wheel, instead of depositing it onto the moving belt, as illustrated by the drawing. In such modifications of the process, means are provided for maintaining the drum or wheel in an inert atmosphere.

Comprising high molecular weight chloral-dichloroacetaldehyde copolymers, the finished plastic products of this invention do not exhibit significant decomposition, i.e., become degraded and discolored, until exposed to temperatures in excess of about 200° C. However, provision may be made in the process to further stabilize these products, if desired, by treating them, under acid conditions, with a suitable stabilizing agent, such as described in a pending application, Serial No. 189,266, filed April 23, 1962, now abandoned, in the name of Irving Rosen. If employed, the stabilizing treatment is effected simultaneously with the washing treatment or is carried out in a subsequent operation prior to drying the films, sheeting or moldings. Additionally, other additives, e.g., antioxidants, stabilizing additives, pigments, etc. may be incorporated into the products either during or subsequent to washing treatment and prior to drying operations.

In the process, the chloral and dichloroacetaldehyde monomers are converted to copolymer products containing, in general, from about 1 up to 70 mol percent of dichloroacetaldehyde and from 99 to about 30 mol percent of chloral. Products exhibiting the best physical properties, e.g., hardness, toughness, etc. contain usually from 40 to 60 mol percent of dichloroacetaldehyde. The percentage composition of the copolymer is determined by elemental carbon analysis conducted on sample specimens of the finished articles. These analyses are, percentagewise, between those values obtained for both chloral and dichloroacetaldehyde homopolymers. The dichloroacetaldehyde content of these copolymers may then be calculated from the differences in percentage between the carbon content of the homopolymers.

The plastic articles prepared by the process of this invention are tough, hard and nonbrittle. Transparent in appearance, they exhibit excellent chemical resistance and fire-retardance. Moldings suitably prepared either directly or by further finishing of the initial products include articles such as doorknobs; latches; hinges, drawer pulls; handles for tools, cutlery, cook-ware and the like; various parts for automotive fuel systems; bearings; washers; gaskets; electrical panel boards; switch plates; protective structural panels; trays; various types of tile and numerous other household, decorative and novelty items. Being non-brittle and extremely resistant to cracking, the molded products of this invention may be cut, drilled or bored. They may be machined easily to produce close-tolerance items such as gears, bushings, valve seats, screws, nuts, bolts, etc. High-quality articles may also be cut without "burring" from slab copolymer moldings by processes similar to metal-stamping techniques.

The preparation of molded copolymer products by the process of this invention is further illustrated in the following examples which show the efficiency of different catalysts in effecting the copolymerization reaction. These examples also list the percentage of dichloroacetaldehyde in the prepared moldings, as well as certain physical property values for these materials. In each example, the monomers are employed in a 70:30 molar ratio of chloral:dichloroacetaldehyde; 1.6 millimols of catalyst is employed per mol of combined monomer charge, unless otherwise indicated; and about 3 parts of anhydrous toluene, by volume, is used for every 4 parts of combined monomer charge. In each example, the process is conducted as described for procedure (b) above for a total reaction period of 20 hours. The mold employed comprises two stainless steel plates, each 12 inches square and ½ inch thick. The plates are fitted one on top of the other with a Teflon frame constituting the mold cavity, between them, the abutting surfaces of each mold component being lined with silicone rubber gaskets, and the entire mold assembly being clamped tightly together. The reaction mixture is blended together for the time specified in each example before being charged to the mold. In Example 5, after the molding operation is completed, the molding obtained is leached with diethyl ether to remove any unreacted monomers, solvent and/or catalyst residues. The molding is then end-group stabilized by treatment with acetic anhydride at 140° C. for 40 minutes and is finally washed and dried under vacuum.

reacted chloral and dichloroacetaldehyde monomers and polymerization catalyst and casting said mixture onto a solid substrate in a second reaction chamber, completing the polymerization of the monomer mixture while maintaining it at a temperature of $-78°$ to $0°$ C. and passing it through the second reaction chamber, thereafter washing and drying the chloral-dichloroacetaldehyde copolymer film product obtained, and finally collecting said film product on a winding mechanism.

4. The process of claim 3 in which the said film product contains from 10 to 60 mol percent of dichloroacetaldehyde.

5. The process of claim 3 in which the monomer mixture is polymerized in the presence of an inert organic liquid reaction medium.

6. The process whereby a monomer mixture containing from about 99 to 30 mol percent of choral and from about 1 to 70 mol percent of dichloroacetaldehyde is polymerized directly into a tough and durable molded article of high molecular weight chloral-dichloroacetaldehyde copolymer, which process comprises thoroughly mixing in a reaction chamber, maintained at a temperature of $-78°$ to $0°$ C., the said monomer mixture and a polymerization

| Example | 1 | 2 | 3 | 4 | 5 |
|---|---|---|---|---|---|
| Catalyst | Diethyl zinc | Di-n-butyl [1] zinc | Diethyl [2] zinc | Di-n-butyl zinc | Di-n-butyl zinc |
| Mixing time, minutes | 5 | 1.5 | 5 | 1.5 | 1.5 |
| Dichloroacetaldehyde, mol percent | 58 | 57 | 50 | 50 | 62 |
| (ASTM D638-61T): | | | | | |
| Tensile strength, p.s.i. | 3,720 | 4,330 | 2,260 | 2,330 | 4,990 |
| Tensile modulus, p.s.i. | 162,800 | 157,900 | 108,300 | 75,500 | 218,600 |
| Hardness (ASTM D1706-61): | | | | | |
| Shore A | 96 | 98 | 98 | 90 | 73 |
| Shore D | 60 | | 55 | 45 | 99 |
| Deflection temperature at 264 p.s.i., ° C. (ASTM D648-56). | | | ca. 200 | | |
| Softening point, ° C | >190 | >180 | 270 | >170 | >190 |
| Initial decomposition, visual, ° C | 260 | >210 | | 220 | >220 |

[1] Concentration of catalyst=0.8 millimol per mol combined monomer charge.
[2] Diethyl zinc complexed with equimolar amount of ethanol.

It is to be understood that although the invention has been described with specific reference to particular embodiments thereof, it is not to be so limited, since changes and alterations therein may be made which are within the full intended scope of this invention as defined by the appended claims.

What is claimed is:

1. A process for polymerizing a monomer mixture containing from about 99 to 30 mol percent of chloral and from about 1 to 70 mol percent of dichloroacetaldehyde directly into a tough and durable formed copolymer article, which process comprises thoroughly mixing in a reaction chamber the said monomer mixture and a polymerization catalyst therefor, withdrawing from the said reaction chamber the flowable reaction mixture prepared and charging it to a forming means, effecting the substantial polymerization of the monomer mixture while it is thus supported by the forming means and is maintained at the reaction temperature, thereafter removing the formed copolymer product from the said forming means and finally washing and drying said product.

2. The process of claim 1 in which the copolymer product contains from 10 to 60 mol percent of dichloroacetaldehyde.

3. A process whereby a monomer mixture containing from about 99 to 30 mol percent of choral and from about 1 to 70 mol percent of dischloroacetaldehyde is polymerized directly into a tough and durable film of high molecular weight chloral-dichloroacetaldehyde copolymer, which process comprises thoroughly mixing in a reaction chamber maintained at a temperature of $-78°$ C. to $0°$ C. the said monomer mixture and a polymerization catalyst therefor, partially polymerizing the monomer mixture in the reaction chamber, removing therefrom a flowable mixture of chloral-dichloroacetaldehyde copolymer, uncatalyst therefor, withdrawing from the said reaction chamber the flowable reaction mixture prepared and charging it into a sectional mold having in its closed position the configuration of the molded article desired, said mold being maintained at a temperature of $-78°$ to $0°$ C., substantially polymerizing the monomer mixture while it is contained in said mold and maintained at the reaction temperature, thereafter the formed chloral-dichloroacetaldehyde copolymer product from the mold and finally washing and drying said product.

7. The process of claim 6 in which the molded copolymer product contains from 40 to 60 mol percent of dichloroacetaldehyde.

8. The process of claim 6 in which the monomer mixture is polymerized in the presence of an inert organic liquid reaction medium.

9. A process for polymerizing a monomer mixture containing from about 99 to 30 mol percent of chloral and from about 1 to 70 mol percent of dichloroacetaldehyde directly into a tough and durable formed copolymer article, which process comprises mixing in a reaction chamber maintained at a temperature of $-78°$ to $0°$ C., the said monomer mixture with from about 0.3 to 5 millimols, per each mol of combined monomer charge, of an anionic polymerization catalyst selected from the group consisting of organometallic compounds and complexes of organometallic compounds with up to molar equivalent amounts of a compound selected from the group consisting of water and lower aliphatic alcohols; withdrawing from the said reaction chamber the flowable reaction mixture prepared and charging it to a forming means being maintained at a temperature of $-78°$ to $0°$ C.; effecting the substantial polymerization of the monomer mixture while thus supported by the forming means and maintained at the reaction temperature; thereafter removing the formed chloral-dichloroacealdehyde copolymer products from the said forming means; and finally washing and drying said product.

10. The process of claim 9 in which the polymerization catalyst is a dialkyl zinc compound which is added to the reaction mixture as a solution in an inert organic liquid.

11. The process of claim 10 in which the polymerization catalyst is diethyl zinc.

12. The process of claim 10 in which the polymerization catalyst is di-n-butyl zinc.

13. The process of claim 9 in which the reaction temperature is between −78° and −30° C. and the reaction time is 2 to 20 hours.

14. A process for polymerizing a monomer mixture containing from about 99 to 30 mol percent of chloral and from about 1 to 70 mol percent of dichloroacetaldehyde directly into a tough and durable film of high molecular weight chloral-dichloroacetaldehyde copolymer, which process comprises thoroughly mixing in reaction chamber maintained at −78° to 0° C., the said monomer mixture with from about 0.3 to 5 millimols, per each mol of combined monomers employed, of an anionic polymerization catalyst selected from the group consisting of organometallic compounds and complexes of organometallic compounds with up to molar equivalent amounts of a compound selected from the group consisting of water and aliphatic alcohols; partially polymerizing the monomer mixture in the reaction chamber; removing therefrom a flowable mixture of chloral-dichloroacetaldehyde copoylmer, unreacted chloral and dichloroacetaldehyde monomers and polymerization catalyst and casting the said mixture as a thin layer onto a moving solid substrate in a second reaction chamber, completing the polymerization of the cast monomer mixture while maintaining it at a temperature of −78° and 0° C. and passing it through the second reaction chamber, thereatfer washing and drying the chloral-dichloroacetaldehyde copolymer film product obtained, and finally collecting said film product on a winding mechanism.

15. The process of claim 14 in which the monomer mixture is polymerized in the presence of an inert organic liquid reaction medium.

16. The process of claim 14 in which the catalyst is a dialkyl zinc compound.

17. The process of claim 14 which is a continuous process.

18. The process of claim 14 in which the total reaction time is 6 hours.

19. A process for polymerizing a monomer mixture containing from about 99 to 30 mol percent of chloral and from about 1 to 70 mol percent of dichloroacetaldehyde directly into a tough and durable molded article of chloral-dichloroacetaldehyde copolymer, which process comprises introducing into a reaction chamber maintained at −78° to 0° C., the said monomers and from about 0.3 to 5 millimols, per each mol of the combined monomer charge, of an anionic polymerization catalyst selected from the group consisting of organometallic compounds and complexes of organometallic compounds with up to molar equivalent amounts of a compound selected from the group consisting of water and aliphatic alcohols; mixing the monomers and the catalyst together in the said chamber for a maximum time period of 5 minutes; thereafter removing therefrom the fluid reaction mixture prepared and charging it into a sectional mold having in its closed position the configuration of the formed article desired, said mold being maintained at a temperature of −78° to 0° C.; polymerizing the monomer mixture while it is contained in said mold and maintained at the reaction temperature; thereafter removing the formed chloral-dichloroacetaldehyde copolymer product from the mold; and finally washing and drying said product.

20. The process of claim 19 in which the polymerization catalyst is diethyl zinc.

21. The process of claim 19 in which the reaction time is 6 to 10 hours.

22. The process of claim 19 in which a plurality of molds is employed.

23. A process for polymerizing a monomer mixture containing from about 99 to 30 mol percent of chloral and from about 1 to 70 mol percent of dichloroacetaldehyde directly into a tough and durable formed copolymer article, which process comprises thoroughly mixing in a reaction chamber the said monomer mixture and a polymerization catalyst therefor, withdrawing from the said reaction chamber the flowable reaction mixture prepared and charging it to a forming means, effecting the substantial polymerization of the monomer mixture while it is thus supported by the forming means and is maintained at the reaction temperature, thereafter removing the formed copolymer product from the said forming means, washing and then treating it with an end-group stabilizing agent and finally washing and drying the stabilized product.

24. The process of claim 23 in which the stabilizing agent is acetic anhydride.

25. A process for polymerizing a monomer mixture containing from 99 to 30 mol percent of chloral and from about 1 to 70 mol percent of dichloroacetaldehyde directly into a tough and durable film of high molecular weight chloral-dichloroacetaldehyde copolymer, which process comprises applying onto a moving solid substrate in a reaction chamber, a polymerization catalyst for the said monomer mixture, applying onto said substrate the monomer mixture so that said catalyst and said monomer mixture are intimately mixed thereon, effecting the polymerization of the resulting monomer-catalyst mixture while it is supported in the reaction chamber and maintained at the polymerization temperature, thereafter washing and drying the chloral-dichloroacetaldehyde copolymer film product obtained, and finally collecting said product on a winding mechanism.

References Cited by the Examiner

UNITED STATES PATENTS 2,982,758   5/1961   Michaud _____ 260—67

WILLIAM H. SHORT, *Primary Examiner.*

L. M. MILLER, *Assistant Examiner.*